(12) United States Patent
Nelson et al.

(10) Patent No.: US 8,360,465 B1
(45) Date of Patent: Jan. 29, 2013

(54) DOOR-MOUNTED AIRBAG SYSTEM

(75) Inventors: Earl H. Nelson, West Haven, UT (US); Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/313,577

(22) Filed: Dec. 7, 2011

(51) Int. Cl.
*B60R 21/21* (2011.01)
(52) U.S. Cl. ..................................... 280/730.2
(58) Field of Classification Search .............. 280/730.2, 280/734, 736, 740, 742
See application file for complete search history.

(56) References Cited

U.S. PATENT DOCUMENTS 3,927,901 A * 12/1975 Weman ......................... 280/734
5,295,709 A * 3/1994 Bell .............................. 280/734
7,581,751 B2 9/2009 Ochiai et al.

FOREIGN PATENT DOCUMENTS

EP 1 250 248 B1 10/2004
GB 2 220 620 A 1/1990

* cited by examiner

*Primary Examiner* — Paul N Dickson
*Assistant Examiner* — Robert A Coker
(74) *Attorney, Agent, or Firm* — Sally J. Brown; Brinks Hofer Gilson & Lione

(57) ABSTRACT

A side impact airbag arrangement mounted in a vehicle door (20) has an air cavity (46) inside the body (22) of the vehicle door (20) an initial volume in an intact state and a reduced volume smaller than the initial volume after a side impact has deformed the door body (22). An airbag cushion (10) is arranged in an airbag compartment (44) adjacent to the air cavity (46). The airbag cushion (10) has an interior configured to be filled with a gaseous medium to inflate the airbag cushion (10). Flapper valves (14) inserted between the air cavity (46) and the interior of the airbag cushion (10) allow a flow of air from the air cavity (46) into the interior of the airbag cushion (10) to inflate the airbag cushion (10) when a side impact deforms the air cavity (46) from the initial volume to the reduced volume.

13 Claims, 4 Drawing Sheets

DOOR-MOUNTED AIRBAG SYSTEM

TECHNICAL FIELD OF THE INVENTION

The present invention generally relates to airbags for use as an impact protection device for an occupant of a motor vehicle. More specifically, it relates to a side airbag module mounted in a vehicle door below a side window. Upon a side impact to the door, the airbag unfolds into the interior of the motor.

BACKGROUND OF THE INVENTION

A usual design of a side airbag module includes a gas generator mounted inside a cavity in a seat back rest, under a fabric cover near a vehicle roof above a door, or in a side panel in the body of a vehicle door. Side airbags mounted in a door or in a vehicle seat are usually designed to make contact with the lower torso of a seat occupant. Side airbags mounted in the roof area typically drop down to form an inflated side curtain to primarily protect the head and upper torso of the seat occupant. It is also possible to mount a side curtain airbag along a lower edge of a window with the airbag inflating upward to form the side curtain. In the event of a lateral impact on the vehicle or of an imminent lateral impact, the gas generator projects inflation gas into an airbag cushion, thereby inflating the airbag cushion. The airbag cushion of an airbag forming a side curtain typically expands into a space between a vehicle occupant and the vehicle window, thereby protecting the occupant from injuries that may be caused by a hard contact with the vehicle window, by broken glass, or by objects penetrating the window. Side impact airbags mounted in the door below the window are typically covered by a door trim panel that has been provided with tear lines and a live hinge. When the airbag inflates, the tear line tears open, and the panel hinges out of the way of the inflating airbag.

The gas generator is typically a pyrotechnical device triggered by an electronic signal from a side impact sensor. Accordingly, the proper function of a side impact airbag depends on the availability of electrical power and an electronic controller. Low-cost vehicles usually do not have a profit margin wide enough to allow for complex electronics. Furthermore, even if a vehicle has an electronic system for triggering the airbag, a conventional side impact airbag depends on proper functioning of the electronic system and the electric power supply.

SUMMARY OF THE INVENTION

It is the objective of the present invention to provide a side impact airbag system that is capable of inflating the side impact airbag even without an operational electronic controller, without a side impact sensor, and without an electric power supply.

This objective is met by a door-mounted side impact airbag system with a curtain-type airbag cushion that is inflated with air displaced by a deformation of the door.

The cushion has a normal state in which it is folded into a compartment underneath a window in the vehicle door. The body of the door has a sealed air cavity that is connected with the interior of the folded airbag cushion through at least one air channel arranged near a bottom portion of the airbag cushion. When the door is deformed from a side impact originating from sliding into a pole or tree, or from another vehicle, the volume of the air cavity decreases, and air is displaced into the airbag cushion that inflates upward to form the airbag curtain.

The air channel or channels may be equipped with flapper valves that prevent that the displaced air returns into the air cavity in the door.

The airbag cushion may be designed with lamellae or the like to keep it relatively flat. That way, a relatively small amount of displaced air unfolds the airbag cushion upward into a functional shape that covers most of the window above the compartment. Suitable materials for the airbag cushion include nylon and plastic films, that are not or only slightly air permeable in order to keep the cushion inflated for several seconds after inflation.

In an alternative embodiment, an air flow or air pressure caused by a door deformation may trigger a pyrotechnical gas generator that produces an additional gas pressure to inflate the airbag curtain.

Further details and advantages of the present invention become apparent from the description of and exemplary embodiment illustrated in the accompanying drawings.

DETAILED DESCRIPTION OF THE DRAWINGS

The accompanying drawings have been provided for illustrative purposes only and are not intended to limit the scope of the invention to the details shown.

Figure 1:
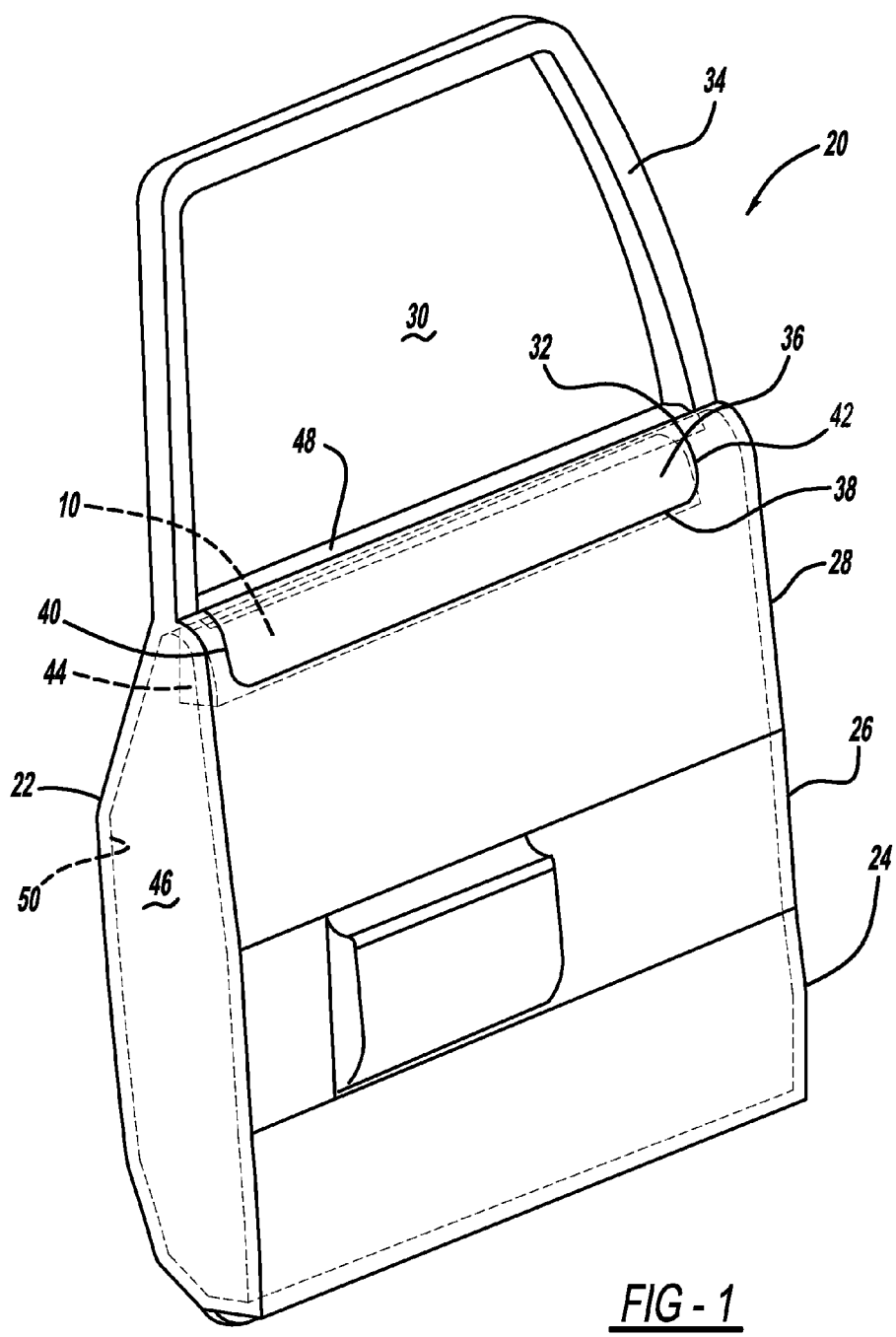
FIG. 1 shows a vehicle door with a built-in side impact airbag system according to the present invention indicated with broken lines.

Referring now to FIG. 1, a driver-side vehicle door 20 is shown in a perspective corresponding to a viewpoint from a vehicle interior. The vehicle door 20 has a door body 22 covered by several sections 24, 26, and 28 of door trim. The materials of the trim sections 24, 26, and 28 are variable and may include fabric, plastic, or leather. Above the door body 22, a retractable window 30 extends upward from a window slot 32 in the door body 22 and is framed by a frame 34.

Underneath the window 30, the door body 22 includes an airbag cover 36 extending along the lower edge of the window 30. The airbag cover 36 is integrated into the uppermost trim section 28 and provided with a live hinge 38 along its lower horizontal edge and pair of tear lines 40 and 42 along its vertical edges. The airbag cover 36 conceals an airbag compartment 44 occupying an upper portion of the door body 22 and accommodating a folded airbag cushion 10 as described below in connection with FIG. 2.

Most of the remainder of the volume of door body 22 serves to store an air volume for inflating the airbag cushion 10 in an air cavity 46. The air cavity 46 may consist of the door body 22 itself that is sealed off to the outside and against the window 30. The door body 22 may, for example, be manufactured to have an airtight lining. For greatly reducing airflow out of the door body 22 through the window slot 32, the window slot 32 may be bordered by a seal 48 (indicated by a dash-dotted line) pressing against the window 30. Other air channels from the air cavity 46 to the outside may be sealed off by appropriate sealing caps and coverings (not shown in detail). Alternatively, a separate air container 50, such as a bladder made of metal or bendable plastic, may be arranged inside the door body to form the air cavity 46.

Figure 2:
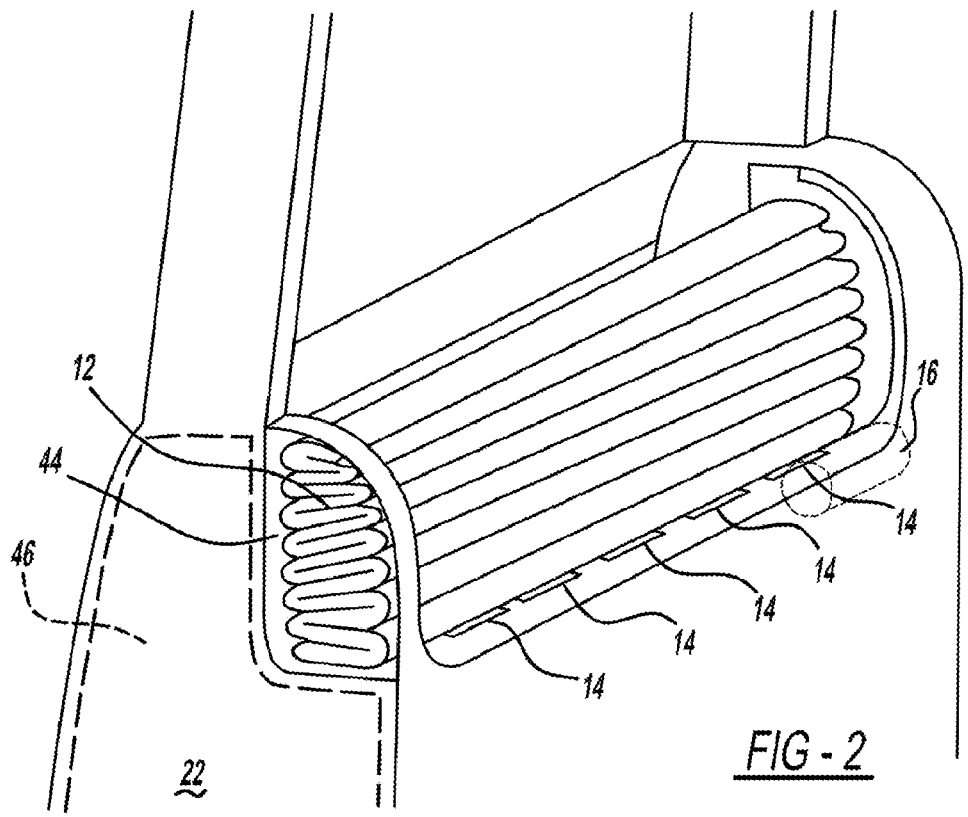
FIG. 2 shows a portion of the door of FIG. 1 in a cutaway view exposing the folded airbag cushion in an airbag compartment.

FIG. 2 shows a cutaway view on a portion of the door 20 of FIG. 1. The airbag cover 36 and a side portion of the door body 22 have been removed to expose the airbag compartment 44 and the folded airbag cushion 10. The airbag cushion 10 is shown as being folded in zigzag-type pleats 12 for easy expansion during inflation. The interior of the airbag cushion 10 is connected to the air cavity 46 through flapper valves 14 indicated along the lower edge of the airbag cushion 10. The flapper valves 14 will be discussed in more detail in connection with FIG. 3.

For illustrative purposes, an optional gas generator 16 for generating a supplemental gas volume for inflating the airbag cushion 10 is indicated adjacent to the flapper valves 14. This gas generator 16 can be mechanically actuated by a moving flapper valve 14, by pressure, or by an air flow streaming past the gas generator 16. The gas generator 16 does not require an electronic impulse from an external electronic controller.

As the airbag cushion 10 is inflated by air entering from the air cavity 46 through the flapper valves 14, the pleats 12 straighten, and the airbag cushion 10 rises from the airbag compartment 44 to an expanded state covering most of the area of the window 30. Further details are discussed in connection with FIG. 4.

Figure 3:
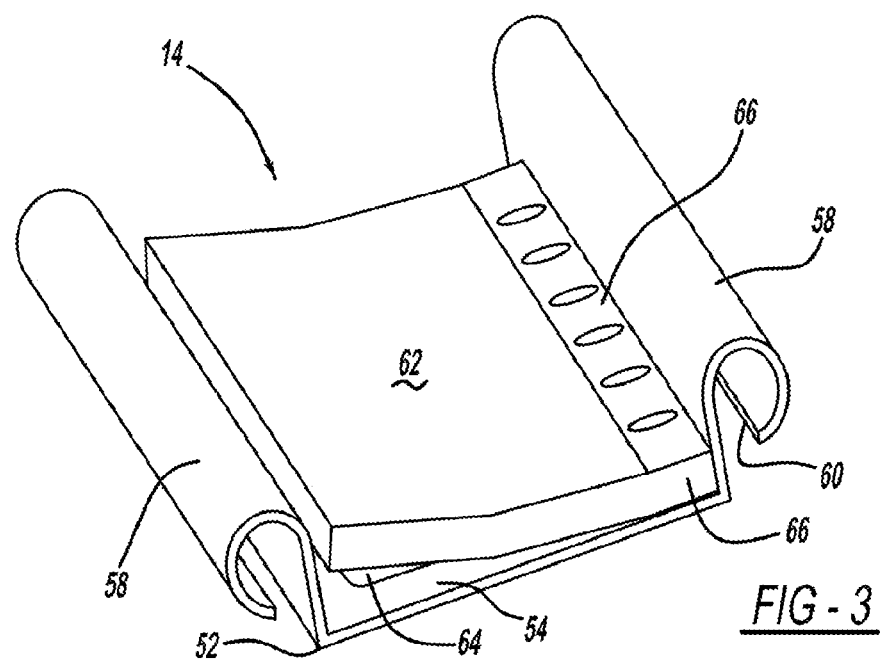
FIG. 3 shows a detail of the side impact airbag system of the present invention depicting a flapper valve in an air channel connecting an air cavity inside the door with the interior of the airbag cushion.

Referring now to FIG. 3, the flapper valves 14 are arranged on a rail 52, of which only a portion along one of the flapper valves 14 is shown in FIG. 3. The rail 52 has an essentially planar central zone 54 spanning the length of the rail 52. The central zone is bordered by rims 58 that are bent to form an approximately O-shaped retention slot 60 on each longitudinal side of the rail 52. The retention slots 60 are open in a downward-facing direction to receive a corresponding bead affixed to an inlet of the airbag cushion (not shown) for securing the airbag cushion to the rail 52 and to establish a pneumatic communication from the flapper valve 14 to the interior of the airbag cushion 10. The flapper valve 14 is formed by a through-hole 64 stamped into the central zone 54 of rail 52 and an elastomeric flap 62. The flap 62 are fastened to the rail 52 along one side 66 adjacent to one of the rims 58. Appropriate ways of fastening the flap 62 include the use of adhesives, rivets, or snap connectors.

The flapper valve 14 of FIG. 3 is shown in a partially open state for illustrative purposes only. The elastomeric material of the flap 62 urges the flap 62 toward a straight shape representing a normal condition, thereby sealingly covering the through-hole 64.

When the pneumatic pressure underneath the rail 52 exceeds the pressure above the rail 52, the pressure difference causes the flap 62 to lift off the central zone 54 as shown in FIG. 3. A large pressure difference raises the flap 62 higher than shown and allows a rapid air flow into the airbag 10. Once the pressure below and above the flap 62 has been approximately equalized, the flap returns to the normal condition of sealing off the through-hole 64. Should the pressure above the flap 62 exceed the pressure below the flap 62, the flapper valve 14 prevents a pressure equalization because the pressure above the flap 62 presses the flap 62 onto the rail 52. When used in a vehicle door 20 as shown in FIG. 2, the flapper valve 14 operates as a check valve allowing an air flow from the air cavity 46 into the interior of the airbag cushion 10 and preventing an airflow in the reverse direction.

Figure 4:
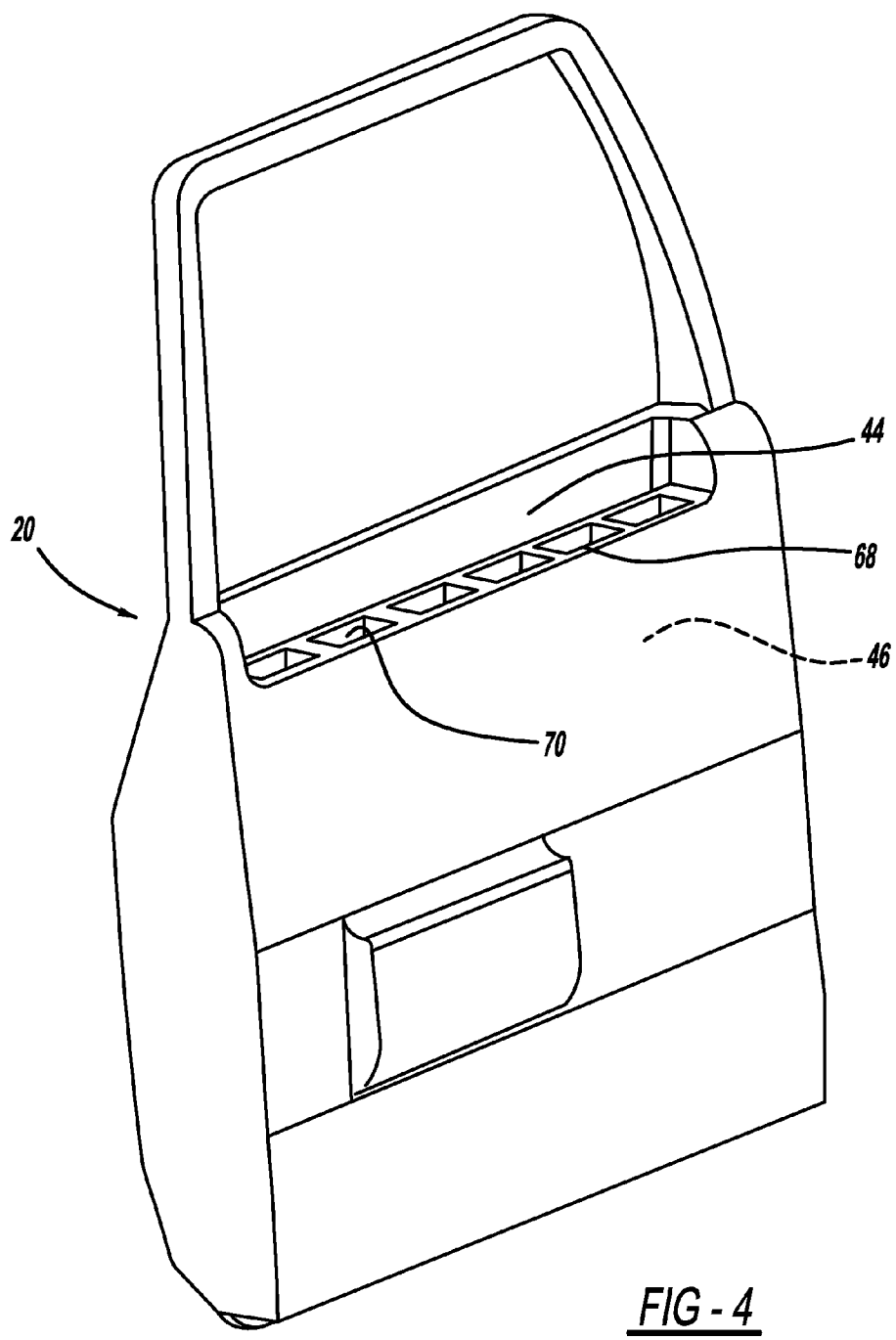
FIG. 4 shows the door of FIG. 1 partially dismantled to reveal the airbag compartment.

Now referring to FIG. 4, the door of FIG. 1 is shown partially dismantled to reveal the airbag compartment 44. On the bottom of the airbag compartment 44, a support frame 68 for the rail 52 separates the airbag compartment 44 from the air cavity 46. The support frame 68 has openings 70 at the locations where the flapper valves 14 are arranged on the rail 52 to ensure a wide opening cross-section of the flapper valves 14.

Figure 5:
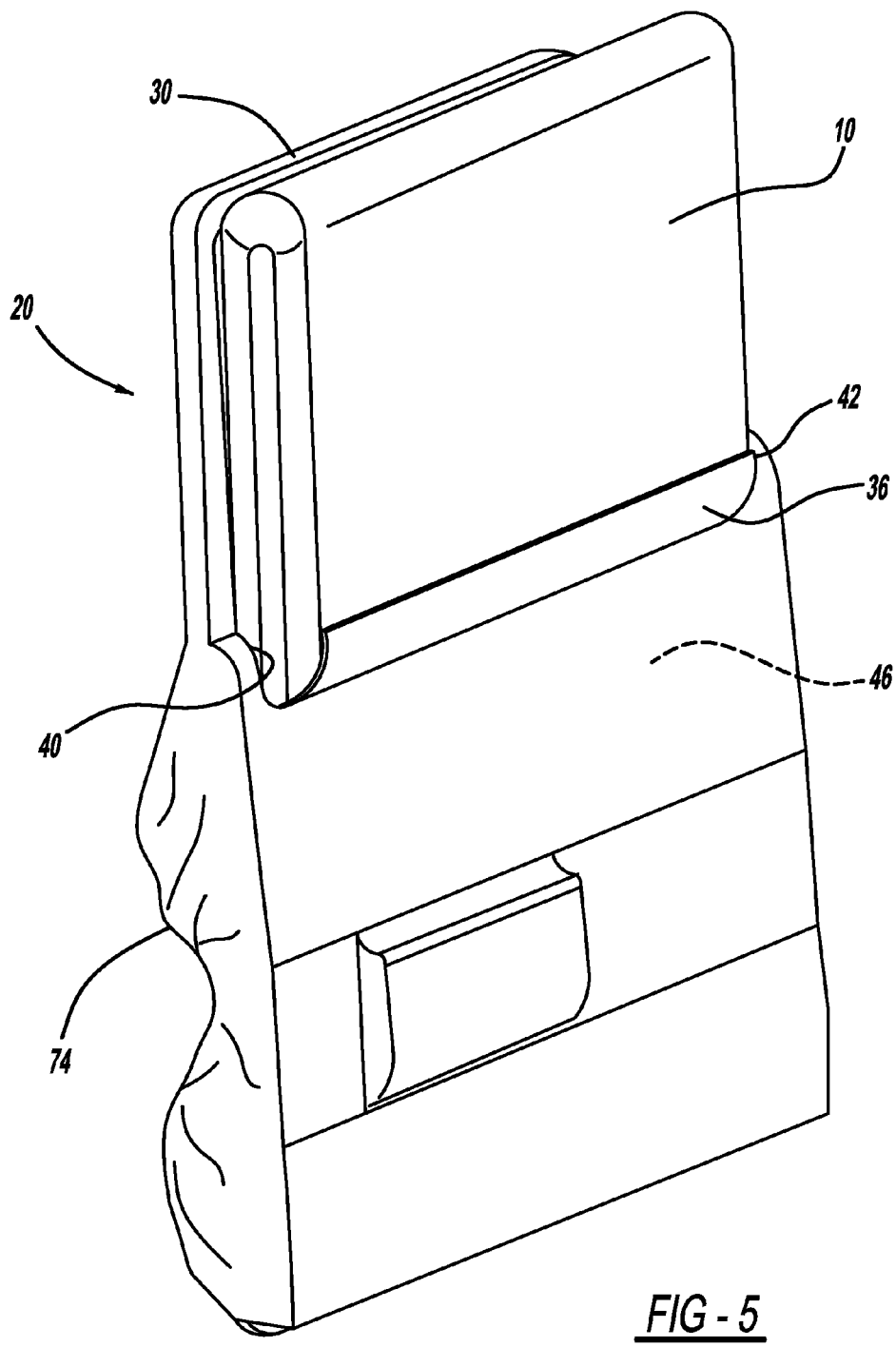
FIG. 5 shows the side impact airbag system of FIGS. 1-3 after inflation.

FIG. 5 illustrates the vehicle door 20 after a side impact deforming the door 20. The door 20 has a deformed exterior skin 72 with an inward dent 74. The dent 74 reduces the volume of the air cavity compared to an intact exterior skin. The reduction of the air cavity volume has displaced a corresponding amount of air from the air cavity 46 into the airbag cushion 10. The airbag cushion 10 has been inflated to an expanded state as shown, covering substantially the entire window 30. The air pressure entering the airbag cushion 10 has generated an upward force strong enough to tear the airbag cover 36 at the tear lines 40 and 42, causing the airbag cover to pivot about the live hinge 38 and to give way to the expanding airbag cushion 10. The flapper valves 14 promote a pressure retention inside the airbag cushion to provide an extended protection of a vehicle occupant against a lateral impact.

The inflated airbag cushion 10 is depicted in FIG. 5 as a flat rectangular body. It is evident that such a shape may be manufactured out of fabric or any other flexible material capable of withstanding the air pressure generated by a side impact. Suitable materials include woven and non-woven fabrics, plastic films, or a combination of the mentioned materials. Furthermore, the airbag cushion may have an internal structure with seams or baffles to stiffen the cushion particularly in a vertical direction.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. Such modifications include combinations of details disclosed in different embodiments. All such modifications and variations are within the scope of the invention as determined by the appended claims when interpreted in accordance with the breadth to which they are fairly, legally, and equitably entitled.

What is claim is:

1. A side impact airbag arrangement for a vehicle, comprising:

an air cavity inside a door body of a vehicle door, the air cavity having an initial volume in an intact state and a reduced volume smaller than the initial volume after a side impact deforming the door body;

an airbag cushion arranged in an airbag compartment adjacent to the air cavity, the airbag cushion having an interior configured to be filled with a gaseous medium from the air cavity to inflate the airbag cushion;

at least one one-way valve between the air cavity and the interior of the airbag cushion, the at least one one-way valve allowing a flow of air from the air cavity into the interior of the airbag cushion to inflate the airbag cushion when a side impact deforms the air cavity from the initial volume to the reduced volume, and restricting the flow of air from the interior of the airbag cushion back to the air cavity.

2. The airbag arrangement of claim 1, wherein the airbag cushion inflates upward to form a side curtain configured to cover most of a vehicle window extending above the door body.

3. The airbag arrangement of claim 1, wherein the at least one one-way valve is formed by a plurality of flapper valves, each flapper valve having a flap covering a through-hole leading from the air cavity to the interior of the airbag cushion, the flap being arranged between the through-hole and the interior of the airbag cushion.

4. The airbag arrangement of claim 3, further comprising a rail with openings forming the through-holes, the rail being configured to be mounted in the vehicle door.

5. The airbag arrangement of claim 4, further comprising a pair of longitudinal rims formed on the rail, the rims being shaped to form retention slots for attaching the airbag cushion.

6. The airbag arrangement of claim 1, further comprising:
the vehicle door;
an airbag cover affixed to the door, the airbag cover concealing the airbag compartment while the airbag is in a deflated state and configured to give way to the airbag cushion upon inflation of the airbag cushion.

7. The airbag arrangement of claim 6, further comprising:
a window configured to be lowered into the door body through a window slot extending longitudinally along a top portion of the door body; and
a seal arrangement lining the window slot along the window to reduce a leakage of air through the window slot.

8. The airbag arrangement of claim 6, wherein the airbag cover has at least one tear line configured to break when the airbag cushion inflates.

9. The airbag cushion of claim 8, wherein the airbag cover has a live hinge, the airbag cover configured to pivot about the live hinge when the at least one tear line breaks.

10. The airbag arrangement of claim 1, further comprising an air container arranged inside the door body and forming the air cavity.

11. The airbag arrangement of claim 10, wherein the air container is formed by a metal bladder.

12. The airbag arrangement of claim 1, wherein the airbag cushion is manufactured of a textile material.

13. The airbag arrangement of claim 1, wherein the airbag arrangement is formed by a plastic film.

* * * * *